United States Patent
Brocke et al.

(10) Patent No.: US 7,801,053 B2
(45) Date of Patent: Sep. 21, 2010

(54) METHOD FOR SETTING CONSISTENT VALUES FOR A PARAMETER IN A NETWORK OF DISTRIBUTED STATIONS, AS WELL AS A NETWORK SUBSCRIBER STATION FOR CARRYING OUT THE METHOD

(75) Inventors: Jens Brocke, Laatzen (DE); Frank Gläser, Hannover (DE); Ralf Köhler, Hannover (DE); Kurt Knuth, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 769 days.

(21) Appl. No.: 10/848,771

(22) Filed: May 19, 2004

(65) Prior Publication Data
US 2004/0258004 A1 Dec. 23, 2004

(30) Foreign Application Priority Data
May 22, 2003 (DE) ................................ 103 22 950

(51) Int. Cl.
*H04L 12/26* (2006.01)
(52) U.S. Cl. ........................ 370/252; 370/257; 370/457
(58) Field of Classification Search ......... 370/241–258, 370/503–516; 710/100, 104
See application file for complete search history.

(56) References Cited

U.S. PATENT DOCUMENTS

| | | | |
|---|---|---|---|
| 6,212,171 B1 * | 4/2001 | LaFollette et al. ........... | 370/257 |
| 7,187,661 B2 * | 3/2007 | Hattig ........................ | 370/257 |
| 2002/0009055 A1 * | 1/2002 | Sugaya ....................... | 370/252 |
| 2002/0064185 A1 * | 5/2002 | Nakai et al. .................. | 370/519 |
| 2003/0048757 A1 * | 3/2003 | Accarie et al. .............. | 370/257 |
| 2005/0226195 A1 * | 10/2005 | Paris et al. ................... | 370/254 |

* cited by examiner

*Primary Examiner*—Ricky Ngo
*Assistant Examiner*—Pao Sinkantarakorn
(74) *Attorney, Agent, or Firm*—Robert D. Shedd; Paul P. Kiel

(57) ABSTRACT

The invention relates to a method for setting consistent values for a parameter in a network of distributed stations (10 to 14), and to a corresponding network subscriber station.

In certain circumstances, it has been found that inconsistent entries can occur for the gap count parameter on the local bus in an IEEE 1394 network. If the bus management instance (25, 26) relies on the automatic behavior, as provided in the Standard, of all the network subscriber stations (10 to 11) to automatically set the maximum value of 63 after the second bus resetting process without any intermediate resetting of this parameter, this can lead to progressive resetting of the network, and this can result in blocking of the network.

The problem is solved by immediate transmission of a parameter setting message for the critical network parameter once an inconsistency has been found. Alternatively, two or more successive inconsistency findings will be tolerated, with the parameter setting message not being transmitted until this stage.

7 Claims, 3 Drawing Sheets

METHOD FOR SETTING CONSISTENT VALUES FOR A PARAMETER IN A NETWORK OF DISTRIBUTED STATIONS, AS WELL AS A NETWORK SUBSCRIBER STATION FOR CARRYING OUT THE METHOD

This application claims the benefit, under 35 U.S.C. 119, of German patent application No. 10322950.7 filed May 22, 2003.

FIELD OF THE INVENTION

The invention relates to the technical field of data communication in a network of distributed stations, in particular to a home network.

BACKGROUND OF THE INVENTION

A home network is used to connect widely differing types of appliance to one another. Appliances such as these may stem from the field of entertainment electronics, such as a television, a video recorder, a DVD player, a satellite receiver, a CD player, an MD player, an amplifier, a radio, a camcorder etc. A personal computer, which may likewise be regarded as an entertainment electronic appliance these days, is also mentioned in this context.

Industry have developed appropriate communication systems for networking of appliances from the entertainment electronics field. This relates primarily to cable-based networking of the appliances with the aid of the so-called IEEE 1394 bus system, which makes it possible to interchange data at a very high data rate between the individual network stations. The IEEE 1394 interfaces which have been widely used until now generally support the specified data transmission rates S100, S200 and S400. In this case, S100 means a data transmission rate of about 100 Mbit/s. S200, in a corresponding manner, means about 200 Mbit/s with S400 then being about 400 Mbit/s. High data rates such as these occur in particular in the case of entertainment electronic appliances. This is due to the fact that the typical application for data interchange between entertainment electronic appliances is for a title to be played back in the case of a video source or audio source, and for either a video film or a piece of music, and the associated data stream, to be transmitted to a further entertainment electronic appliance, or to two or more further entertainment electronic appliances. For this application, a data link is set up between the relevant appliances which are interchanging data with one another. Data packets are then transmitted regularly via this data link. This form of data transmission is referred to in IEEE Standard 1394 as isochronous data transmission, in which data packets are transmitted regularly, at specific intervals, from the data source to the data sink or to data sinks.

Furthermore, asynchronous data transmission also takes place via the IEEE 1394 bus. In this case, data packets are effectively transmitted as required. The number of such asynchronous data packets which are sent via the bus depends on the amount of data traffic. Asynchronous data transmission is used predominantly for identification and control of an appliance in the network by some other appliance in the network.

IEEE Standard 1394 specifies only the lower layers of the ISO/OSI reference model for data communication. These are the physical layer, the data link layer, and a so-called transaction layer which comprises parts of the network layer and of the transport layer. The transmission protocol to be used for transmission of isochronous and asynchronous data packets via the bus using the physical layer is specified in detail. The transmission protocols in each case specify specific dead times which must be complied with on the bus between the data packets to be transmitted for both isochronous and asynchronous data traffic. These are waiting times during which no network subscriber station may access the bus. Waiting times such as these are also specified, for example, before the start of a data transmission cycle, as will be explained in more detail later.

IEEE Standard 1394 contains only a small number of restrictions with regard to the topology of the IEEE 1394 network. The permissible bus topology corresponds to a tree structure. Depending on the application, the tree structure may, however, differ, and the network may be designed in a highly variable manner in this context. In order to take account of these conditions, IEEE Standard 1394 provides an internal variable, whose value is included in the calculation of some of the important waiting times in IEEE Standard 1394 mentioned above. This internal variable is referred to as a gap count in IEEE Standard 1394. The waiting times can be matched to the respective specific bus topology by changing the gap count value, in order to avoid wasting bandwidth on the IEEE 1394 bus as a result of unnecessarily long waiting times. The internal variable for the gap count value is in this case administered in the physical layer chip of each IEEE 1394 node. If all of the network stations on the local IEEE 1394 bus are intended to be able to access the bus correctly and without conflict, the gap count value must be set identically in all the 1394 interfaces. Furthermore, one instance in the network, the so-called bus manager, or the isochronous resource manager if there is no bus manager, carries out a monitoring function.

IEEE Standard 1394, which was first issued officially in the IEEE 1394-1995 version, has now been revised, with subsequent versions being published. These include the IEEE Version 1394a and, very recently, IEEE Version 1394b, as well. While IEEE Version 1394a specifies improvements with regard to speeding up the arbitration phase as well as to an improved bus resetting behavior and an improved interface for the connection of the physical layer and of the data link layer, IEEE Version 1394b relates largely to a technological extension to the data transmission towards higher data transfer rates up to 1.6 Gbit/s, and to a wide range of transmission media that can be used, such as glass fiber, plastic fiber, copper UTP and copper STP.

In certain circumstances (for example as a result of changes to the gap count value in a local node or as a result of the different bus resetting behavior of nodes which comply with IEEE 1394-1995 and IEEE 1394a), it is possible for inconsistent gap count values to occur on the local bus. IEEE Standard 1394a therefore provides for the bus manager or the isochronous resource manager to have the obligation to recheck the consistency of all the gap count values on the local bus after every bus resetting process. This Standard likewise stipulates that the bus manager or the isochronous resource manager must initiate a further bus resetting process if any inconsistent values are found. Inconsistent values occur when different values for the internal variable of the gap count are set in two network nodes. Even the IEEE 1394-1995 Standard provides for each IEEE 1394 node to have to set the gap count value when two successive bus resetting processes occur without any intermediate transmission of a so-called physical layer configuration packet (PHY configuration packet), in order to change the gap count value to the maximum value of 63. This functionality is specified for the physical layer module. The procedure specified in IEEE Standard 1394a should thus ensure that the gap count values are consistent with the value 63 in all of the network nodes after two successive bus resetting processes.

BRIEF DESCRIPTION OF PREFERRED EMBODIMENTS

However, it has been possible for the inventors to observe that there are normally IEEE 1394 nodes which, owing to incorrect driving of the physical layer module by the local IEEE 1394 software, have in fact not set the gap count value to the standard value of 63 after two successive bus reset operations without an intermediate physical layer configuration packet. This behavior, which does not comply with the standard, can result in the problem of the bus manager or the isochronous resource manager continuously initiating a bus reset process as a result of inconsistent values for the gap count being found, and thus blocking the network, in the worst case to the extent of action by the user. The manager instance finds inconsistent gap count values, initiates a bus resetting process in order to correct the gap count values, still finds an inconsistency, once again initiates a bus resetting process, and so on.

In order to prevent this problematic behavior of the management instance, the invention provides that, after finding inconsistent values for the gap count after a bus resetting process, the management instance forms a so-called physical layer configuration packet either immediately or at least after a reasonable number of successive bus resetting processes in which inconsistent gap count values are found, before the initiation of the new bus resetting process. The management instance then uses this physical layer configuration packet to send the gap count value which corresponds to the detected bus topology, and this value may be less than 63. However, if the management instance has not been able to determine an optimized gap count value corresponding to the bus topology, then, for certainty, it should send the maximum value of 63 in the physical layer configuration packet. This physical layer configuration packet resets the gap count values in all the network nodes. This is because the physical layer configuration packets are evaluated directly by the physical layer module in each network node in order to change the gap count, so that it is impossible for any incorrect settings to occur in this case as a result of faulty, higher-layer IEEE 1394 software. This allows the consistency of the gap count values to be forced, without the possibly faulty IEEE 1394 software in a network node having any influence on this.

This measure is claimed in a general form in the independent claims 1 and 8.

Further specific forms and improvements are specified in the dependent claims.

BRIEF DESCRIPTION OF THE DRAWINGS

The invention will be explained in more detail in the following text with reference to drawings, in which.

DETAILED DESCRIPTION OF PREFERRED EMBODIMENTS

Figure 1:
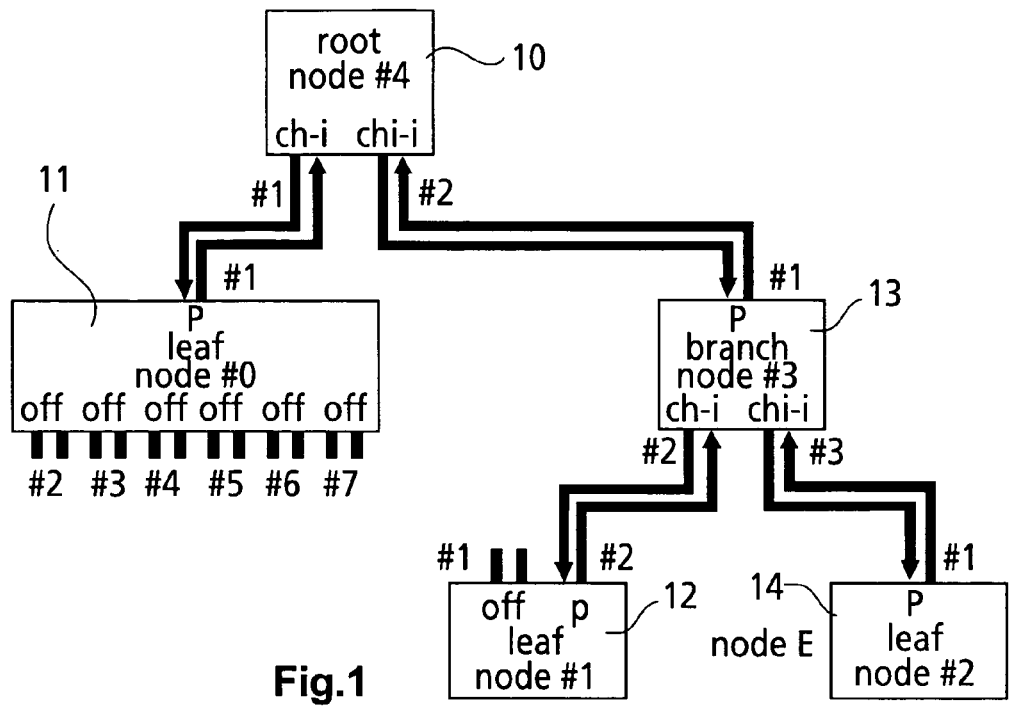
FIG. 1 shows the structure of an example of an IEEE 1394 network.

FIG. 1 shows an example of an IEEE 1394 network with five network subscriber stations. These are interconnected in a tree structure. In this case, one node is in each case connected to another via a separate IEEE 1394 network cable. The number of cable connections (ports) may vary from node to node. In the illustrated example, the station 13 is equipped with a so-called 3-port physical layer module, the two network nodes 12 and 10 each have one 2-port physical layer module, the station 11 has a 7-port physical layer module, and the station 14 has a 1-port physical layer module.

The precise details of the bus initialization phase, the tree structure identification phase and the self-identification phase are known from IEEE Standard 1394. In this context, reference is therefore made expressly to IEEE Standard 1394-1995, a standard for a high performance serial bus, which was issued in 1995.

One network node is defined as a so-called "root" in each IEEE 1394 network. This root carries out specific control functions in the network, as will be explained in more detail in the following text. In FIG. 1, the node with the reference number 10 carries out this function.

Figure 2:
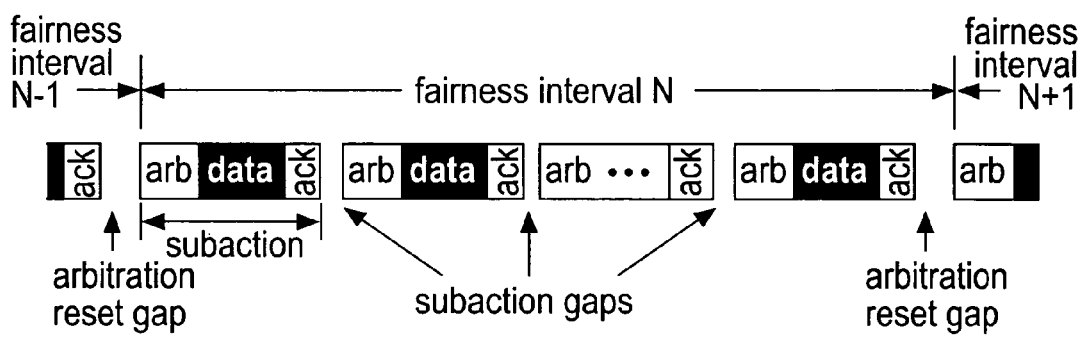
FIG. 2 shows the transmission protocol for asynchronous data transmission based on a so-called "fairness interval" in accordance with IEEE Standard 1394-1995.

FIG. 2 shows asynchronous data transmission based on a correct transmission protocol, which is provided in the Standard and is referred to in the Standard as a so-called fairness interval. This transmission protocol ensures that each network node can transmit one asynchronous data packet within the interval. The sequence in which the data packets are transmitted is governed by an arbitration process, which is always won by the network node having the highest priority number. As is shown in FIG. 2, the start of data packet transmission is always preceded by an arbitration phase, which is referred to as "arb". This is used to determine which network node must send its data packet first. Once a network node with a higher priority has transmitted the data packet, it does not take part again in the next arbitration phase within the fairness interval that has been started, so that the network node with the next lower priority then wins the arbitration process. As is shown in FIG. 2, each transmitted data packet with the exception of so-called broadcast packets is also acknowledged by the receiver. The acknowledgement message is annotated "ack". All of the network subscriber stations have to comply, in accordance with the transmission protocol, with a waiting time after each acknowledgement message and at the end of a broadcast packet. In FIG. 2, this is annotated as a "subaction gap". Once every network station which wished to transmit an asynchronous data packet has also done so, all of the network subscriber stations have to comply with a further waiting time before a next fairness interval starts. This second waiting time is annotated as the "arbitration reset gap" in FIG. 2. Further details relating to arbitration processes, asynchronous data transmission and the layout of data packets can be found in IEEE Standard 1394. With regard to the disclosure of the invention relating to this, reference is once again made expressly to IEEE Standard 1394.

The value of the gap count parameter for the IEEE 1394 bus is included in the calculation of some of the various waiting times which are defined in IEEE Standard 1394. IEEE Standard 1394 defines the following waiting times, which are dependent on the gap count value:

a) Subaction gap—this waiting time is in each case waited for between the transmissions of asynchronous data packets within the fairness interval, before a network node may determine that it may arbitrate.

b) Arbitration delay—this waiting time is waited for after identification of a subaction gap by the network node which is intended to arbitrate, before the actual arbitration process.

c) Arbitration reset gap—this waiting time is waited for before starting an asynchronous data transfer in the new fairness interval after the end of the data transmission in one fairness interval.

The associated formulae for calculation of the waiting times are defined in IEEE Standard 1394, and will therefore not be explained in detail here.

The variable parameter gap count in accordance with IEEE Standard 1394 ensures that no packets collide with one another or with arbitration signals on the IEEE 1394 bus, and that all the nodes in the network each have a chance to access the bus and are not prevented from doing so, for example, by different signal delay times in the network. This would be the case if the signal delay time from one node to the node which is furthest away is greater than the arbitration reset gap waiting time minus the subaction gap waiting time because, in this situation, the node which had released the bus after the data packet transmission would identify the waiting time based on the arbitration reset gap earlier, even before the node which is furthest away had identified the subaction gap waiting time at all.

The Standard specifies the greatest possible gap count value to be 63. Depending on the number of network stations that are actually present in the network and the specific network structure, this value may, however, be reduced in order to avoid wasting bandwidth unnecessarily. The mechanisms which are used to optimize the gap count value are described in IEEE Standard 1394. The gap count value optimization process is carried out by a bus management instance.

Figure 3:
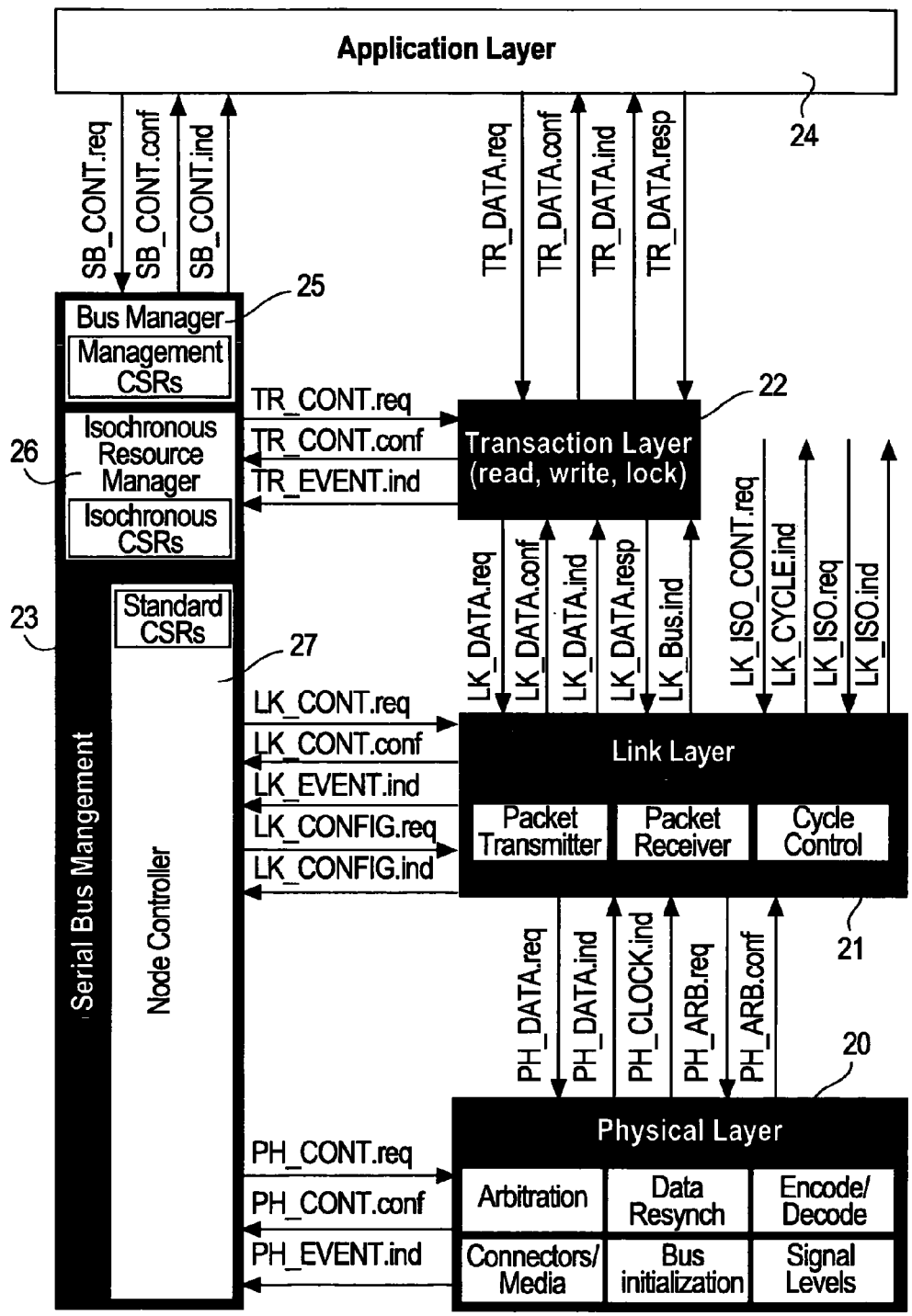
FIG. 3 shows the so-called protocol architecture of an IEEE 1394 node in accordance with IEEE Standard 1394-1995.

In order to explain this in more detail, FIG. 3 shows the protocol architecture of an IEEE 1394 interface. The two communication layers comprising the physical layer 20 and the link layer 21 are formed by separate circuit units, that is to say by hardware. The other layers that are shown, specifically the transaction layer 22, the serial bus management 23 and the application layer 24, are normally implemented by means of software, which is then run on a powerful microcontroller in the network station. The individual components relating to the physical layer 20 and the link layer 21 as well as the transaction layer 22 are described in more detail in IEEE Standard 1394, and will therefore not be explained in any more detail here.

The node controller 27, isochronous resource manager 26 and bus manager 25 components are emphasized within the layer of the serial bus management 23. A maximum of one bus manager 25 and a maximum of one isochronous resource manager 26 are active at any given time in a 1394 network, even if two or more network nodes can carry out the respective function. However, both functions are optional according to IEEE Standard 1394. A procedure which is carried out after each bus resetting process in accordance with IEEE Standard 1394 is used to decide which network node will carry out each function. If the root node can carry out the respective function, the stated procedure means that there is a good probability of the respective function of the root being activated. However, it is also possible for there to be no bus manager whatsoever, so that the isochronous resource manager (if it exists) also has to carry out some of the tasks of the bus manager.

The task of optimization of the gap count parameter in the IEEE 1394 network is carried out by the bus manager 25. If there is no bus manager 25, this task is also carried out by the isochronous resource manager 26. For gap count value optimization, the bus manager or the isochronous resource manager evaluates the so-called self-ID packets from all of the network nodes, in order to find the maximum number of connecting paths (hops) for that data transmission in the network between the network stations that are furthest away. This number then determines the optimum gap count value to be set. This is specified in IEEE Standard 1394 in the form of a table. In order now to set a different gap count value in all of the network nodes, IEEE Standard 1394 provides for the transmission of a physical layer configuration packet which, in accordance with IEEE standard 1394, is received and evaluated by all of the network stations.

Figure 4:
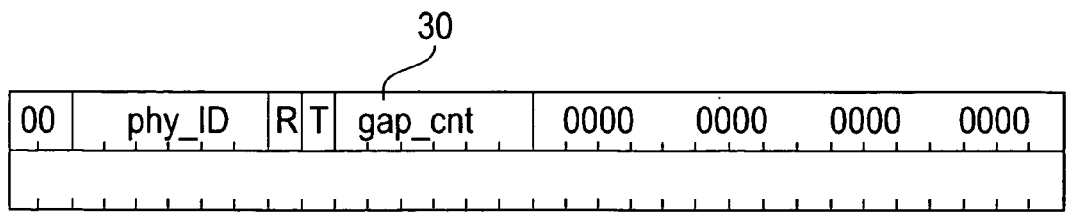
FIG. 4 shows the format of a physical layer configuration packet in accordance with IEEE Standard 1394.

FIG. 4 shows the structure of the physical layer configuration packet, which contains a 6-bit field 30 for the gap count value that is to be reset. The other entries will not be explained in any more detail here, since they are known from IEEE Standard 1394.

IEEE Standard 1394 does not specify the optimization of the gap count value as being essential, and the bus manager or the isochronous resource manager can carry out this optimization process optionally. Furthermore, there is no specification as to when a new gap count value should be set with the aid of a physical layer configuration packet. This depends on the specific implementation.

Figure 5:
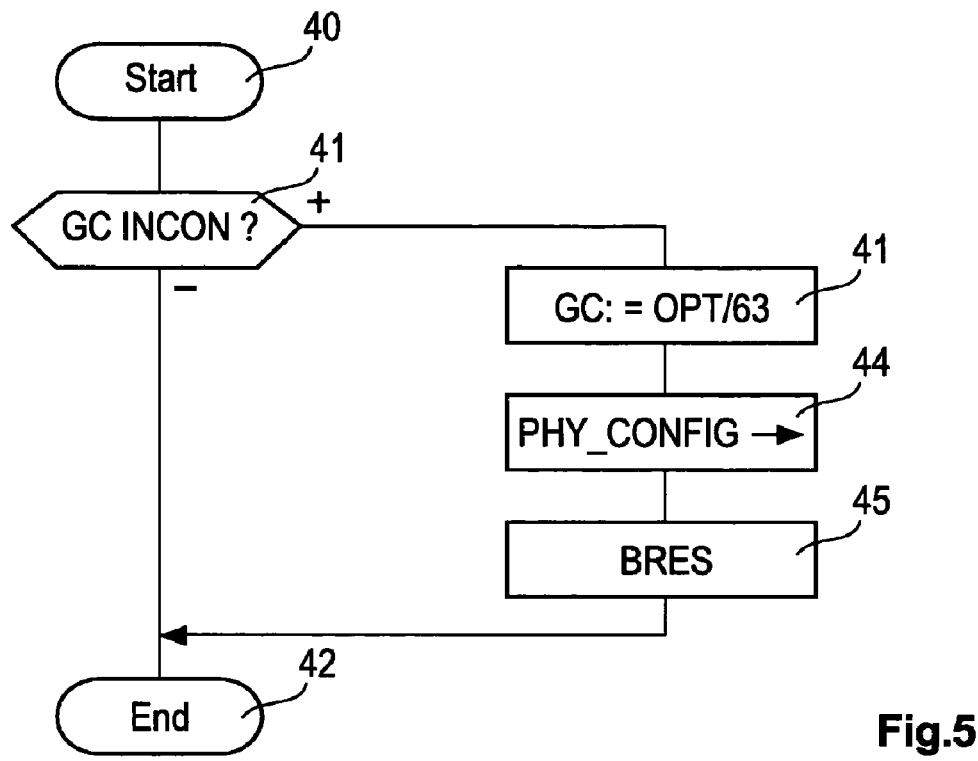
FIG. 5 shows a first example of a flowchart for a program for processing in the bus management instance in order to carry out the invention.

The invention now proposes that this optimization process be carried out whenever inconsistent gap count value settings have been found in the local network by renewed evaluation of all the self-ID packets after a bus resetting process. FIG. 5 shows a corresponding first exemplary embodiment of a program for carrying out gap count optimization according to the invention, which program should be run in the bus manager or in the isochronous resource manager.

The reference number 40 in FIG. 5 denotes the program start. Reference number 41 denotes a program step in which a check is carried out to determine whether there is any inconsistency in the gap count values in the network. In the event of a bus resetting process, all of the network stations send self-ID packets, which each contain a field in which the currently set gap count value is entered. All that is necessary in the program step 41 is thus to compare the gap count value entries in all the self-ID packets with one another. If the gap count values are all set identically, there is no inconsistency. In this case the program is ended in the program step 42.

If inconsistent gap count values were found in the check 41, the program jumps to the program step 43, in which the gap count value to be set is set to the optimum value in accordance with the defined bus topology or, alternatively, the maximum value 63 is chosen if it has not been possible to determine an optimized gap count value. This value set in this way is then used to form a physical layer configuration packet in the program step 44, and this is then sent to all of the network subscribers. After this, in the program step 45, the management instance initiates the bus resetting process, as specified in IEEE Standard 1394 when inconsistent gap count values are found.

The program is then ended once again with the program step 42. A physical layer configuration packet is thus sent immediately after an inconsistency has been found for the first time, and is used to set all the gap count values. This results in data consistency, since all of the network nodes have to implement the gap count value contained in it immediately after receiving the physical layer configuration packet.

Figure 6:
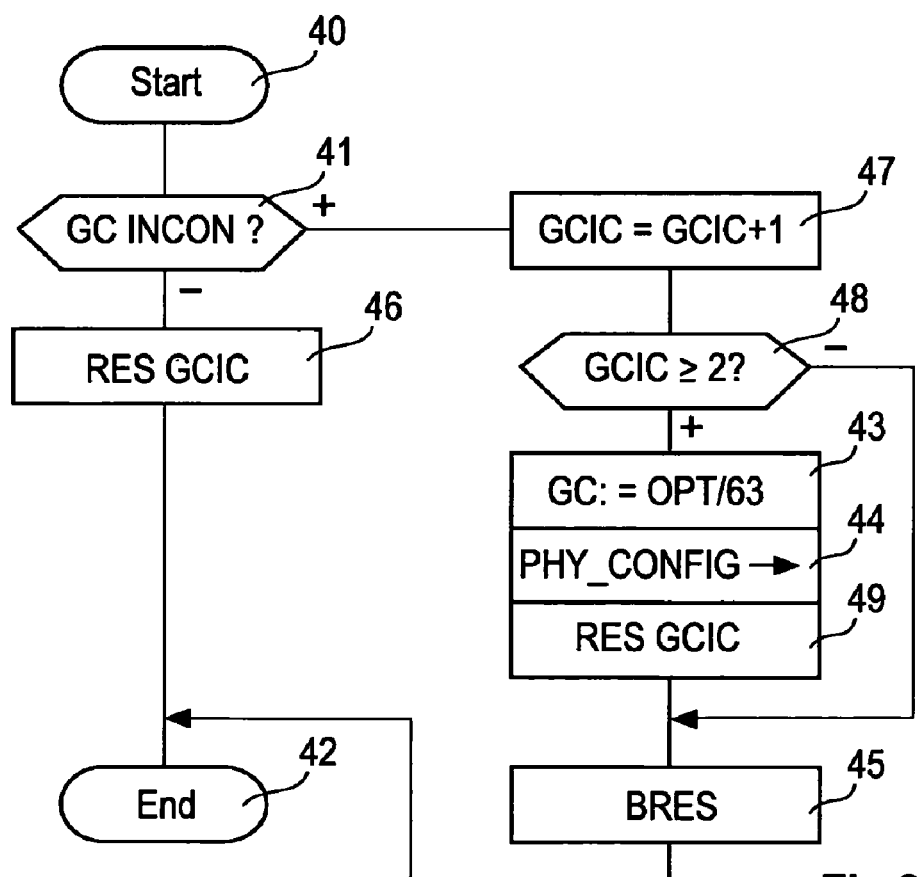
FIG. 6 shows a second example of a flowchart for a program for processing in the bus management instance in order to carry out the invention.

FIG. 6 shows a second exemplary embodiment of a program for optimization of the gap count values. Some of the reference numbers in FIG. 6 are the same as those used in FIG. 5 and these, correspondingly, denote the same program steps as those already explained.

The difference from the first exemplary embodiment is that, in this case, before sending the physical layer configuration packet with gap count value optimized to the bus topology or with the maximum value 63, a check is first of all carried out to determine whether the inconsistent gap count values have been found twice successively. A GCIC counter (gap count inconsistency counter) is incremented in the program step 47 on each occasion when inconsistency is found. A check is then carried out in the next program step 48 to determine whether the count of the GCIC counter has reached or exceeded the value 2. If this is not yet the case, no physical layer configuration packet is sent at this stage. Only after inconsistency has been found on a second occasion is a physical layer configuration packet then once again formed and sent, in the program step 44, to all of the network subscriber stations. Once this packet has been sent, the GCIC counter is reset to the value 0 in the program step 49. Then, in the program step 45, the management instance once again initiates the bus resetting process, as specified in IEEE Standard 1394 when inconsistent gap count values are found, irrespective of whether a physical layer configuration packet has or has not already been sent. If no gap count value inconsistency was found in the program step 41, the GCIC counter must likewise be set to the value 0 in order that the method can start once again from a defined initial state if any inconsistency is found subsequently. This is done in the program step 46.

The example in FIG. 6 thus shows that variable setting is possible depending on the number of bus resetting processes after which the inconsistency in the gap count values should be corrected by additionally transmitting the physical layer configuration packet.

The invention is not restricted to the exemplary embodiments described here. The principle of the invention can be used whenever waiting times for bus access have to be complied with in a network, and these waiting times can be matched to the bus topology by means of a programmable parameter. Apart from the IEEE 1394 bus system, this also relates to other bus systems, for example, also including wire-free transmission systems such as HIPERLAN/2 or IEEE 802.11x.

What is claimed, is:

1. A method for setting consistent values for a timing parameter in a network of distributed stations, comprising:

checking by an administration unit in the network, the timing parameter set within the network of distributed stations, the timing parameter specifying a wait time during which no network station can access the bus, and wherein when the administration unit finds network blocking behavior that prevents operation in accordance with a bus standard, including inconsistent values for the timing parameter on a first occasion or repeatedly, after having initiated a bus reset one time or repeatedly, in accordance with the bus standard that should result in setting of consistent values for the timing parameter in the network of distributed stations, the administration unit, determining a parameter value to be included in a parameter setting message;

sending said parameter setting message to the network subscriber stations and initiating a further bus reset after sending said parameter setting message in order to ensure the consistency of the timing parameter throughout the network of distributed stations.

2. The method as claimed in claim 1, with the permissible value range of a parameter being dependent on the network topology, and in which the parameter can be set identically in all of the network subscriber stations.

3. The method as claimed in claim 2, with the parameter corresponding to an internal variable, whose value is included in the calculation of important waiting times, which have to be complied with, for a communication protocol.

4. The method as claimed in claim 1, with the network being a network which complies with IEEE Standard 1394, and the parameter relating to the gap count parameter which is specified in that Standard.

5. The method as claimed in claim 4, with the parameter setting message corresponding to the transmission of a physical layer configuration packet.

6. The method as claimed in claim 4, with the gap count parameter being set by the parameter setting message to an optimized minimum value, which corresponds to the network topology, or to some other permissible value up to and including the maximum value 63.

7. A network subscriber station for carrying out the method as claimed in claim 1, having an administration unit with computer program means, which checks the consistency for a timing parameter of the values which are set for the subscriber stations in the network, wherein the computer program means in the administration unit determines a parameter value, which specifies a wait time during which no network station can access the bus, to be included in a parameter setting message, sends said parameter setting message to the network subscriber stations when they find network blocking behavior that prevents operation in accordance with a bus standard, including inconsistent parameter values on a first occasion or repeatedly, after having initiated a bus reset one time or repeatedly, in accordance with the bus standard that should result in setting of consistent values for the parameter value, and initiates a further bus reset after sending said parameter setting message in order to ensure the consistency of the set parameter values throughout the network.

* * * * *